(12) United States Patent
Steinbuchel, IV

(10) Patent No.: US 12,062,869 B2
(45) Date of Patent: Aug. 13, 2024

(54) ELECTRICAL CONNECTOR ASSEMBLY

(71) Applicant: Webasto Charging Systems, Inc., Monrovia, CA (US)

(72) Inventor: Herman Joseph Steinbuchel, IV, Pasadena, CA (US)

( * ) Notice: Subject to any disclaimer, the term of this patent is extended or adjusted under 35 U.S.C. 154(b) by 908 days.

(21) Appl. No.: 17/127,819

(22) Filed: Dec. 18, 2020

(65) Prior Publication Data
US 2022/0200205 A1   Jun. 23, 2022

(51) Int. Cl.
*H01R 13/631* (2006.01)
*B60L 53/16* (2019.01)
*H01R 13/623* (2006.01)

(52) U.S. Cl.
CPC .......... *H01R 13/631* (2013.01); *B60L 53/16* (2019.02); *H01R 13/623* (2013.01); *H01R 2201/26* (2013.01)

(58) Field of Classification Search
CPC .......... H01R 13/631; H01R 13/623; H01R 2201/26; H01R 13/629; H01R 13/6397; H01R 24/86; B60L 53/16
See application file for complete search history.

(56) References Cited

U.S. PATENT DOCUMENTS

| | | |
|---|---|---|
| D680,065 S | 4/2013 | Shibamura et al. |
| D733,046 S | 6/2015 | Shin |
| 9,257,249 B2 | 2/2016 | Inagaki et al. |
| 9,296,303 B2 | 3/2016 | Mueller et al. |
| 9,634,435 B1 | 4/2017 | Raschilla et al. |
| 2011/0204715 A1 | 8/2011 | Nakamura et al. |
| 2014/0306520 A1 | 10/2014 | Oe et al. |
| 2016/0059731 A1 | 3/2016 | Jung et al. |
| 2019/0016218 A1 | 1/2019 | Haag et al. |
| 2020/0238841 A1 | 7/2020 | Zaki |

FOREIGN PATENT DOCUMENTS

| | | | | |
|---|---|---|---|---|
| DE | 102005001939 A1 | * | 10/2005 | ........... H01R 13/623 |
| DE | 102013111321 A1 | * | 4/2015 | ......... H01R 13/6273 |
| EP | 2434585 A2 | * | 3/2012 | ........... H01R 13/426 |
| EP | 2722937 B1 | * | 9/2020 | ............. H01R 13/42 |
| JP | 2000182702 A | * | 6/2000 | ........... H01R 13/625 |
| WO | 2013076540 A1 | | 5/2013 | |
| WO | 2013076542 A1 | | 5/2013 | |

* cited by examiner

*Primary Examiner* — Travis S Chambers
(74) *Attorney, Agent, or Firm* — Concept IP LLP; Michael Zarrabian

(57) ABSTRACT

An electrical connector assembly includes a socket defining a central cavity and having a plurality of pins arranged inside the central cavity. The electrical connector assembly further includes a plug having a body adapted to extend, at least partially, inside the central cavity and defining a plurality of receptacles to receive the plurality of pins. The plug also includes a cover arranged surrounding, at least partly, the body and adapted to engage with the socket. The cover includes a pair of elongated wings arranged diametrically opposite to each other and directed outwardly and extending along a longitudinal portion of the cover.

8 Claims, 12 Drawing Sheets

ELECTRICAL CONNECTOR ASSEMBLY

TECHNICAL FIELD

Embodiments relate generally to an electrical connector assembly, and more particularly to an electrical connector assembly used for charging electric vehicles.

BACKGROUND

An electrical connector is an apparatus used to transfer electricity from a power supply to a utility device, such as an electrical vehicle. The electrical connector generally includes a plug and socket arrangement to transfer power from an electricity source to the utility device. In such a case, one of the plug and socket, for example, the plug is connected to a cable extending from the electricity source, while the other of the plug and socket, for example, the socket is connected to a cable attached to the utility device. For electrically connecting the utility device to the electricity source, an operator or user attaches the first cable with the second cable by engaging the plug and the socket. However, the current plug and socket that are used for connecting the electric vehicle to a charging station are difficult to connect and have a tendency to disconnect from each other, which is undesirable.

SUMMARY

A system embodiment may include an electrical connector assembly. The electrical connector assembly includes a socket defining a central cavity and having a plurality of pins arranged inside the central cavity. The electrical connector assembly also includes a plug having a body adapted to extend, at least partially, inside the central cavity and defining a plurality of receptacles to receive the plurality of pins. The plug further includes a cover arranged surrounding the body and adapted to engage with the socket. The cover includes a pair of elongated wings arranged diametrically opposite to each other and directed outwardly and extending along a longitudinal portion of the cover.

Another system embodiment includes an electrical connector assembly having a socket and a plug. The socket defines a central cavity and having a plurality of pins arranged inside the central cavity. The socket includes at least one retention structure. Further, the plug has a body adapted to extend, at least partially, inside the central cavity and defining a plurality of receptacles to receive the plurality of pins. The plug also includes a cover arranged surrounding the body and adapted to engage with the socket. The cover includes a pair of elongated wings arranged diametrically opposite to each other and directed outwardly and extending along a longitudinal portion of the cover. Moreover, the cover includes at least one engagement structure adapted to engage with the at least one retention structure to retain and lock the plug with the socket.

An electrical connector assembly may include: a socket defining a central cavity and having a plurality of pins arranged inside the central cavity; and a plug comprising: a body adapted to extend, at least partially, inside the central cavity and defining a plurality of receptacles to receive the plurality of pins; and a cover arranged to surround the body and adapted to engage with the socket, the cover comprising a pair of elongated wings arranged diametrically opposite to each other and directed outwardly and extending along a longitudinal portion of the cover.

In additional electrical connector assembly embodiments, the cover includes at least one engagement structure and the socket includes at least one retention structure adapted to engage with the at least one engagement structure to retain and lock the plug with the socket. In additional electrical connector assembly embodiments, the at least one retention structure may be a groove and the at least one retention structure may be a protrusion adapted to be arranged inside the groove. In additional electrical connector assembly embodiments, the cover may be arranged circularly around the body defining a gap therebetween, where the protrusion extends radially inwardly inside the gap from the cover, and the groove may be defined along an outer surface of the socket.

In additional electrical connector assembly embodiments, the protrusion extends radially outwardly from the cover, and the groove may be defined by an inner surface of the socket. In additional electrical connector assembly embodiments, the cover includes a first portion adapted to be inserted inside the socket and a second portion extending rearwardly from the first portion, where the pair of elongated wings extends outwardly of the second portion and the at least one retention structure extends radially outwardly of the first portion.

In additional electrical connector assembly embodiments, the groove includes a straight portion extending axially from an end of the socket to facilitate an insertion of the protrusion inside the groove, and a curved portion extending circularly from the first portion and arranged along at least a portion of a circumference of the socket, where the protrusion may be positioned inside the curved portion to lock the plug with the socket. In additional electrical connector assembly embodiments, the curved portion may be a helical groove extending along an inner surface of the socket.

In additional electrical connector assembly embodiments, the plug includes a first guide structure extending axially along an outer surface of the body, and the socket includes a second guide structure extending axially along an inner surface of the socket and adapted to engage with the first guide structure to facilitate the engagement of the plug with the socket in a correct orientation.

Additional electrical connector assembly embodiments further include a housing to house a plurality of electrical circuits, where the socket may be removably engaged with the housing and may be at least partially disposed inside the housing. In additional electrical connector assembly embodiments, the plug includes a first lock structure extending axially from one of the pair of elongated wings, and the socket includes a second lock structure adapted to engage with the first lock structure to facilitate a locking of the plug with the socket.

Another electrical connector assembly embodiment may include: a socket defining a central cavity and having a plurality of pins arranged inside the central cavity, the socket comprising at least one retention structure; and a plug comprising: a body adapted to extend, at least partially, inside the central cavity and defining a plurality of receptacles to receive the plurality of pins; and a cover arranged to surround the body and adapted to engage with the socket, the cover comprising a pair of elongated wings arranged diametrically opposite to each other and directed outwardly and extending along a longitudinal portion of the cover, where the cover includes at least one engagement structure adapted to engage with the at least one retention structure to retain and lock the plug with the socket.

In additional electrical connector assembly embodiments, the at least one retention structure may be a groove and the at least one engagement structure may be a protrusion adapted to be arranged inside the groove. In additional electrical connector assembly embodiments, the cover may be arranged circularly around the body defining a gap therebetween, where the protrusion extends radially inwardly from the cover and inside the gap, and the groove may be defined along an outer surface of the socket.

In additional electrical connector assembly embodiments, the protrusion extends radially outwardly from the cover, and the groove may be defined by an inner surface of the socket. In additional electrical connector assembly embodiments, the cover includes a first portion adapted to be inserted inside the socket, a second portion extending rearwardly from the first portion, where the pair of elongated wings extends outwardly of the second portion and the at least one retention structure extends radially outwardly of the first portion.

In additional electrical connector assembly embodiments, the groove includes a straight portion extending axially from an end of the socket to facilitate an insertion of the protrusion inside the groove; and a curved portion extending circularly from the first portion and arranged along at least a portion of a circumference of the socket, where the protrusion may be positioned inside the curved portion to lock the plug with the socket. In additional electrical connector assembly embodiments, the curved portion may be a helical groove extending along an inner surface of the socket. In additional electrical connector assembly embodiments, the plug includes a first guide structure extending axially along an outer surface of the body, and the socket includes a second guide structure extending axially along an inner surface of the socket and adapted to engage with the first guide structure to facilitate the engagement of the plug with the socket in a correct orientation. In additional electrical connector assembly embodiments, the plug includes a first lock structure extending axially from one of the pair of elongated wings; and the socket includes a second lock structure adapted to engage with the first lock structure to facilitate a locking of the plug with the socket.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present system allows for easy electrical connection of the electrical vehicle to an electrical grid for charging the electrical vehicle.

Figure 1:
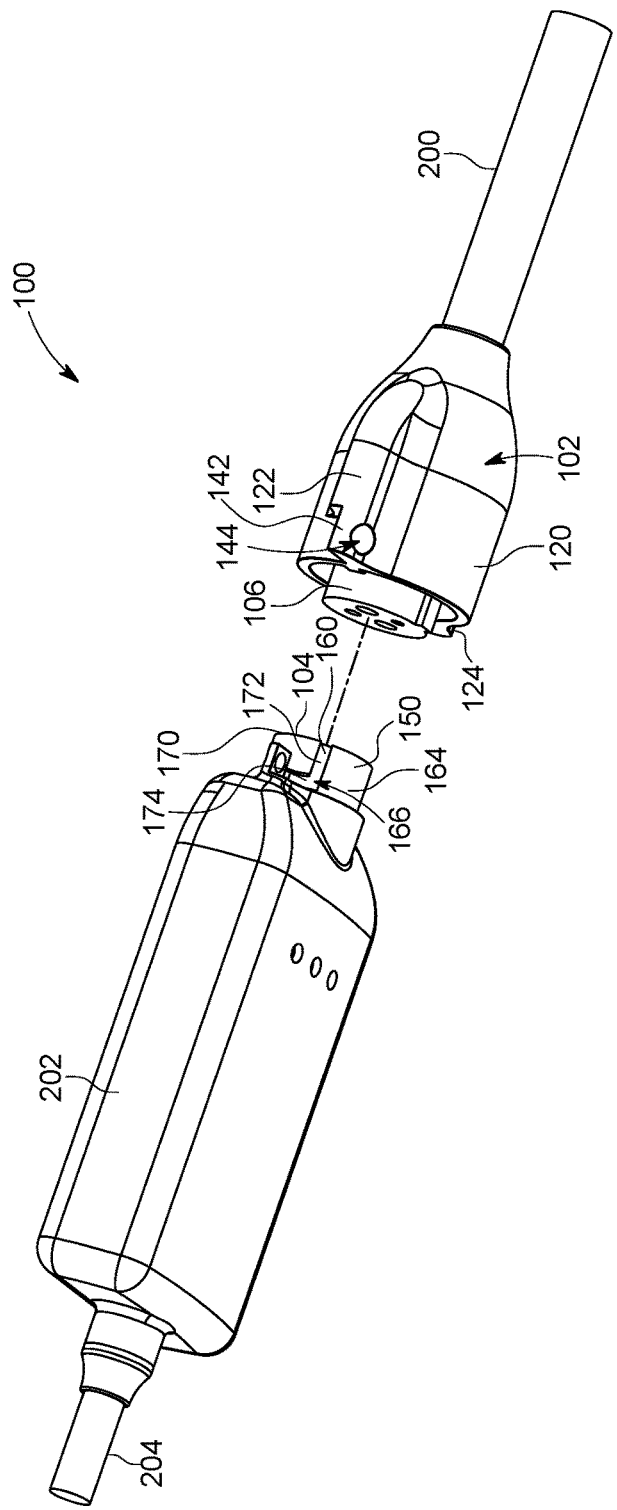
FIG. 1 depicts an electrical connector assembly having a first connector and a second connector, according to an embodiment of the disclosure.
Figure 2:
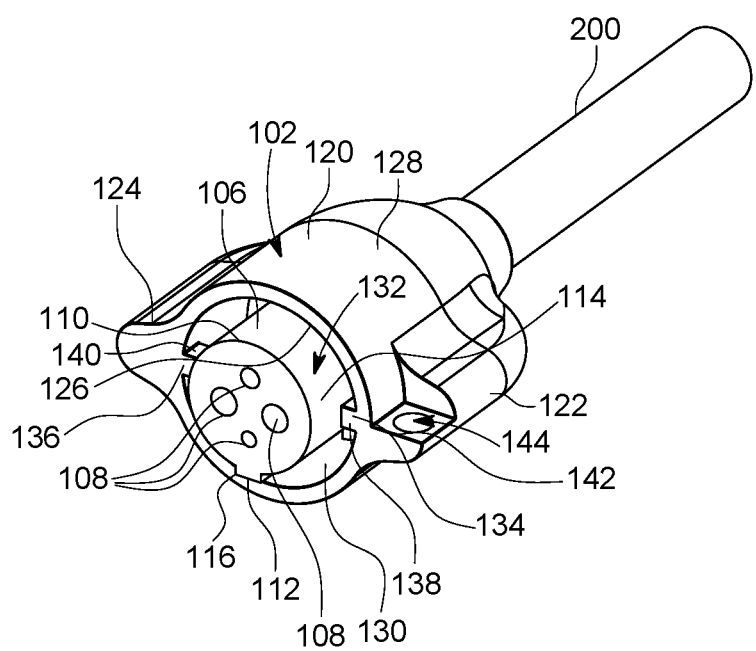
FIG. 2 depicts an enlarged view of the first connector of FIG. 1 according to an embodiment of the disclosure.

Referring to FIG. 1, an electrical connector assembly 100 is shown, according to an embodiment of the disclosure. The electrical connector assembly 100 may be used for electrically connecting an electric vehicle to an electrical grid for charging the electrical vehicle, and includes a first connector 102 (also referred to as plug 102) adapted to connect to a first cable 200 and a second connector 104 having a housing 202 that in turn is connected to a second cable 204. The housing 202 may include various electrical circuits or components, such as, but not limited, a processor, a charge controller, a fault detector, etc. to facilitate a safe supply of current to the electrical vehicle. As shown in FIGS. 1 and 2, The first connector 102 includes a cylindrical body 106 defining a plurality of receptacles 108 extending axially from a first end 110 towards a second end of the cylindrical body 106. Each of the plurality of receptacles 108 defines an access opening at the first end 110 of the cylindrical body 106. In an embodiment, cylindrical body 106 is made of an electrically insulating material, such as, but not limited to, rubber, bakelite, etc. To facilitate an electric connection of the first cable 200 with the second cable 204 through the first connector 102 and the second connector 104, the first connector 102 includes a plurality of conductors (not shown) disposed inside the plurality of receptacles 108. The conductors may be connected to the first cable 200 to enable a flow of electricity from or to the first cable 200.

In an embodiment, the plurality of receptacles 108 may include a first receptacle 108a, a second receptacle 108b, a third receptacle 108c, and a fourth receptacle 108d. In some embodiments, as shown in FIG. 2, the first connector 102 may include a first guide structure 112 extending from the first end 110 towards the second end and arranged at an outer surface 114 of the cylindrical body 106. In an embodiment, the first guide structure 112 may be a protrusion 116 extending radially outwardly from the outer surface 114 of the cylindrical body. The first guide structure 112 facilitates the engagement of the cylindrical body 106, and hence the first connector 102, with the second connector 104 in a correct orientation. Although the protrusion 116 is contemplated as the first guide structure 112, it may be envisioned that the first guide structure 112 may be a groove extending radially inwardly from the outer surface 114 of the cylindrical body 106.

Moreover, the first connector 102 includes a cover 120 arranged surrounding the cylindrical body 106 and adapted to rotate relative to the first cable 200 and the body 106. The cover 120 is adapted to engage with the second connector 104 and includes a pair of elongated wings, for example, a first wing 122 and a second wing 124 disposed diametrically opposite to the first wing 122, directed outwardly and extending along a longitudinal portion of the cover 120. The wings 122, 124 facilitates a holding of the first connector 102 and rotation of the cover 120 relative to the cylindrical body 106. The cover 120 includes a first longitudinal end 126 disposed proximate to the first end 110 of the body 106, an outer surface 128 and an inner surface 130 defining a gap 132 between the body 106 and the cover 120. In an embodiment, a portion of the cylindrical body 106 extends outwardly of the cover 120. Accordingly, the first end 110 is disposed at an offset and outwardly of the first longitudinal end 126 of the cover 120.

Further, the cover 120 includes at least one engagement structure, for example, a first engagement structure 134 and a second engagement structure 136, disposed along the inner surface 130 of the cover 120. The engagement structures 134, 136 are disposed diametrically opposite to each other and are adapted to the couple/engage with the second connector 104 to facilitate a retention and locking of the first connector 102 with the second connector 104. In an embodiment, the engagement structures 134, 136 may be protrusions 138, 140 extending radially inwardly from the inner surface 130 and disposed proximate to the first longitudinal end 126. Moreover, at least one of the elongated wings 122, 124, for example, the first wing 122 may include a first lock structure 142 extending in an axial direction and defining a first padlock hole 144 to facilitate a positive retention/connection of the cover 120 with the housing 202. The first padlock hole 144 may extend through a thickness of the first lock structure 142 and is disposed proximate to the first longitudinal end 126. As shown, an axis of the first padlock hole 144 is substantially perpendicular to a longitudinal axis of the cover 120.

Figure 3:
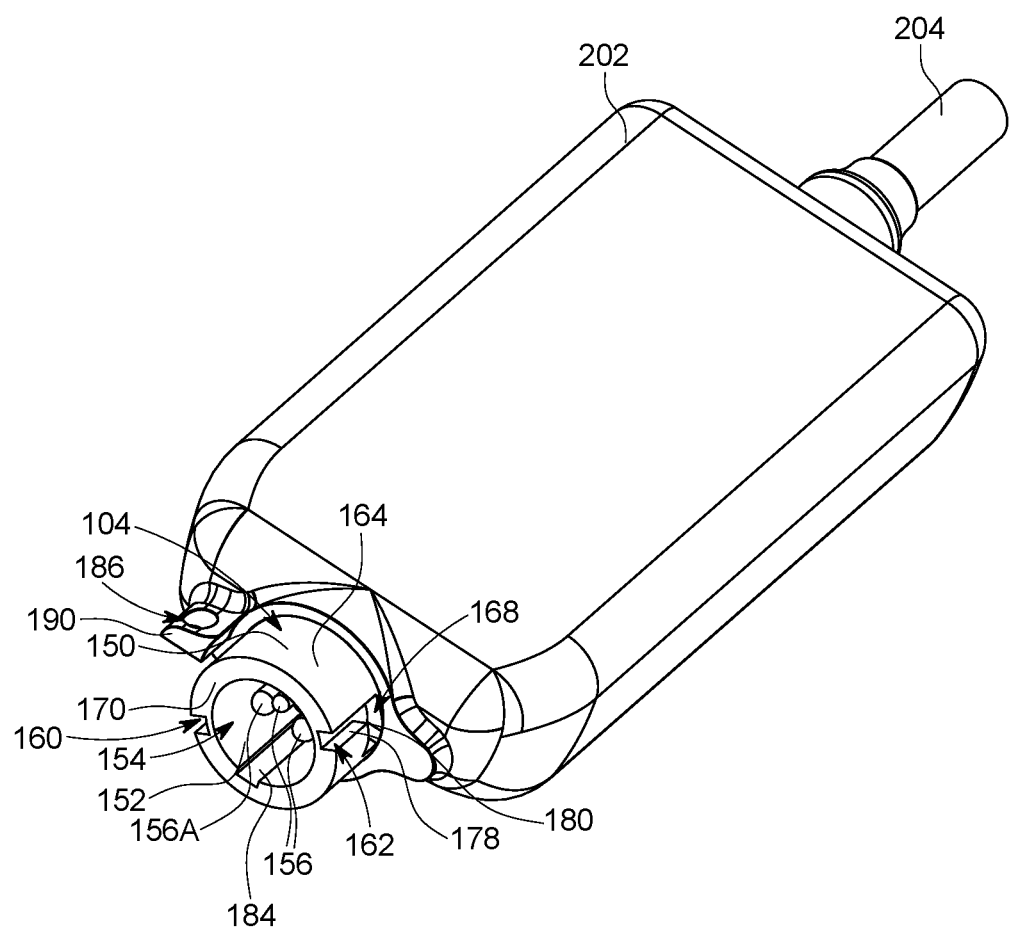
FIG. 3 depicts a side perspective view of the second connector of FIG. 1 according to an embodiment of the disclosure.

Referring to FIGS. 1 and 3, the second connector 104 is coupled to the housing 202 and is arranged at a first end of the housing 202. As shown, the second connector 104 is integrally formed with the housing 202 and a portion of the second connector 104 is disposed inside the housing 202, while a remaining portion of the second connector 104 is disposed outside the housing 202. As shown, the second connector 104 includes a socket 150 having an inner surface 152 defining a chamber 154 (also referred to as central cavity 154) and a plurality of pins 156 extending inside the chamber 154. The pins 156 are adapted to extends inside the plurality of receptacles 108 and are electrically connected to the second cable 204. In an embodiment, a pin 156*a* has a length and diameter that is relatively large when compared with the remaining pins 156. It may be appreciated, at first, the longest pin 156*a* is inserted inside the associated receptacle 108. Accordingly, the pins 156 are inserted inside the associated receptacles 108 sequentially. Similarly, during disassembly of the first connector 102 from the second connector 104, the longest pin 156*a* disengages from the corresponding receptacle 108 after all other pins 156 are removed from the corresponding receptacles 108. In an embodiment, the pin 156*a* is a ground pin 156*a* that connects the electrical connector assembly 100 to the ground and provides crucial ground protection to the user. The length of the pin 156*a* is relatively greater than the remaining pins 156 to ensure that the electrical connector assembly 100 is first connected to the ground before making contact with the power supply mains thereby protecting the user and/or the electrical connector assembly 100. In some embodiments, a signal pin is the shortest pin of the pins such that the signal pin disconnects before the retention structures fully disengage, allowing time for the relays to open and de-energize the output and preventing hot disconnect of the connector.

In an assembly of the first connector 102 and the second connector 104, the cylindrical body 106, at least partly, is arranged/located inside the chamber 154. The second connector 104 includes at least one retention structure, for example, a first retention structure 160 and a second retention structure 162, disposed along an outer surface 164 of the socket 150, and adapted to connect/engage with the engagement structures 134, 136. In an embodiment, retention structures 160, 162 are grooves 166, 168 defined by the outer surface 164 and extending from a first end 170 of the socket 150 towards the housing 202. As shown in FIG. 1, a first groove 166 of the grooves 166, 168 includes a first straight portion 172 extending axially from the first end 170 of the socket 150 towards the housing 202 and a first curved portion 174 extending from the first straight portion 172 in an arcuate manner along a part of the circumference of the socket 150. In certain embodiments, the first curved portion 174 may be a helical groove extending helically from the first straight portion 172 to the housing 202. Similarly, a second groove 168 of the grooves 166, 168 includes a second straight portion 178 extending axially from the first end 170 of the socket 150 towards the housing 202 and a second curved portion 180 extending from the second straight portion 178 in an arcuate manner along a part of the circumference of the socket 150. In certain embodiments, the second curved portion 180 may be a helical groove extending helically from the second straight portion 178 to the housing 202. The straight portions 172, 178 of the grooves 166, 168 facilitate an insertion of the protrusions 138, 140 inside the grooves 166, 168, while the curved portions 174, 180 is adapted to receive the protrusions 138, 140 upon rotation of the cover 120, and facilitate a positive locking of the cover 120 with the socket 150.

In an embodiment, socket 150 may include a second guide structure 182 adapted to engage with the first guide structure 112 to facilitate the insertion of the cylindrical body 106 inside the socket 150 in the correct orientation. In an embodiment, the second guide structure 182 is an elongated groove 184 extending in an axial direction from the first end 170 of the socket 150. The elongated groove 184 also extends radially outwardly from the inner surface 152 of the socket 150. Moreover, the second connector 104 may include a second lock structure 186 extending outwardly from the first end of the housing 202 and in proximity to the first retention structure 160. The second lock structure 186 is adapted to abut and engage with the first lock structure 142. The second lock structure 186 defines a second padlock hole 190 to facilitate a positive retention/connection of the cover 120 with the housing 202. The second padlock hole 190 may extend through a thickness of the second lock structure 142 and aligns with the first padlock hole 144 in an assembly of the first connector 102 with the second connector 104. As shown, an axis of the second padlock hole 190 is substantially perpendicular to a longitudinal axis of the socket 150.

Further, in an assembly of the first connector 102 and the second connector 104, the socket 150 is disposed inside the gap 132 such that the engagement structures 134, 136 are engaged with the retention structures 160, 162. To facilitate the connection of the first connector 102 with the second connector 104, an operator may push a portion of the cylindrical body 106 inside the chamber 154 so that the cover 120 contacts the outer surface 170 of the socket 150. For inserting the cylindrical body 106 inside the socket 150, the first guide structure 112 is aligned with the second guide structure 182 such that the first guide structure 112 of the first connector 102 engages with the second guide structure 182 of the second connector and moves along the second guide structure 182 as the cylindrical body 106 is pushed inside the chamber 154. Further, upon a partial insertion of the cylindrical body 106, the cover 120 may contact the socket 150 and upon subsequent insertion of the cylindrical body 106 inside the chamber 154, the socket 150 moves axially inside the gap 132. For inserting the socket 150 inside the gap 132, the protrusions 138, 140 are aligned with the respective straight portions 172, 178 of the grooves 166, 168. For so doing, the operator may rotate the cover 120 relative to the cylindrical body 106 by holding the elongated wings 122, 124.

Subsequently, the protrusions 138, 140 are moved axially inside the corresponding straight portions 172, 178 as the cylindrical body 106 is pushed inside the chamber 154. Also, after the cylindrical body 106 is completely inserted inside the chamber 154, the operator may rotate the cover 120 to position the protrusions 138, 140 inside the associated curved portions 174, 180 of the grooves 166, 168. In embodiments in which the first curved portion 174 and the second curved portion 180 are helical grooves, the cylindrical body 106 is pushed inside the chamber 154 in response to the movement of the protrusions 138, 140 inside the curved portions 174, 180 due to the rotation of the cover 120 relative to the cylindrical body 110. Due to the insertion of the cylindrical body 106 inside the chamber 154, the pins 156 are inserted inside the receptacles 108, thereby electrically connecting the first cable 200 with the second cable 204. Accordingly, the cover 120, and hence the first connector 102, is locked with the socket 150, and hence the second connector 104. Further, the first connector 102 is locked with the housing 202 by inserting a lock through the first padlock hole 144 and the second padlock hole 190.

Figure 4:
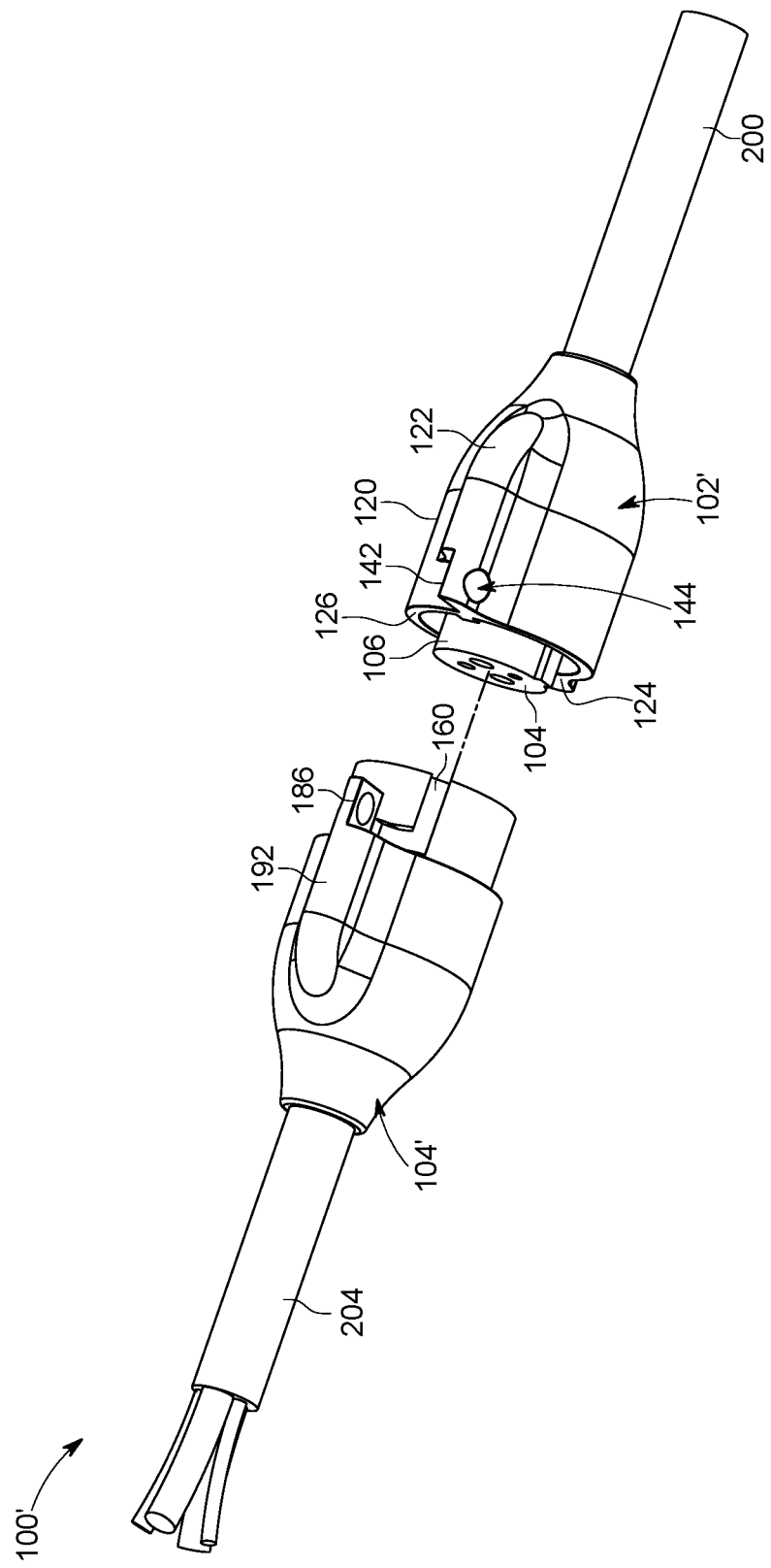
FIG. 4 depicts an electrical connector assembly having a first connector and a second connector, according to an embodiment of the disclosure.
Figure 5:
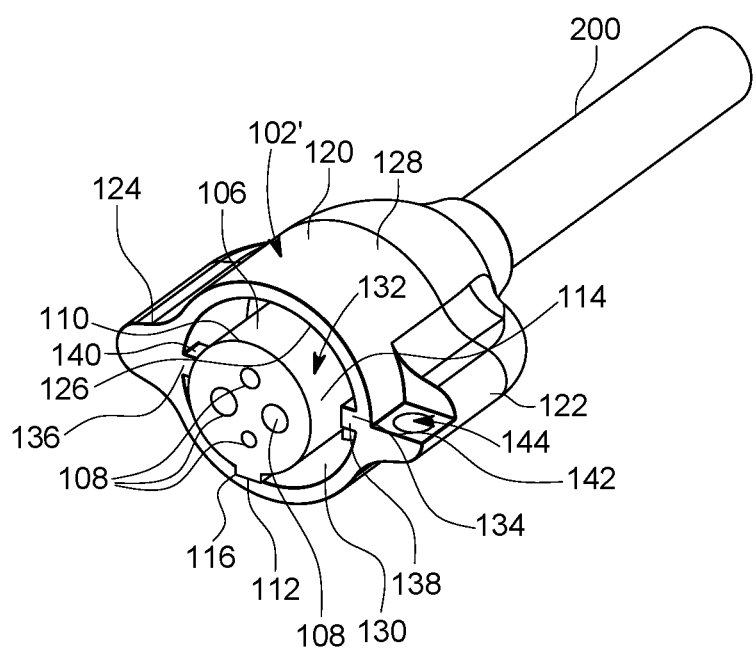
FIG. 5 depicts an enlarged perspective view of the first connector of FIG. 4 according to an embodiment of the disclosure.
Figure 6:
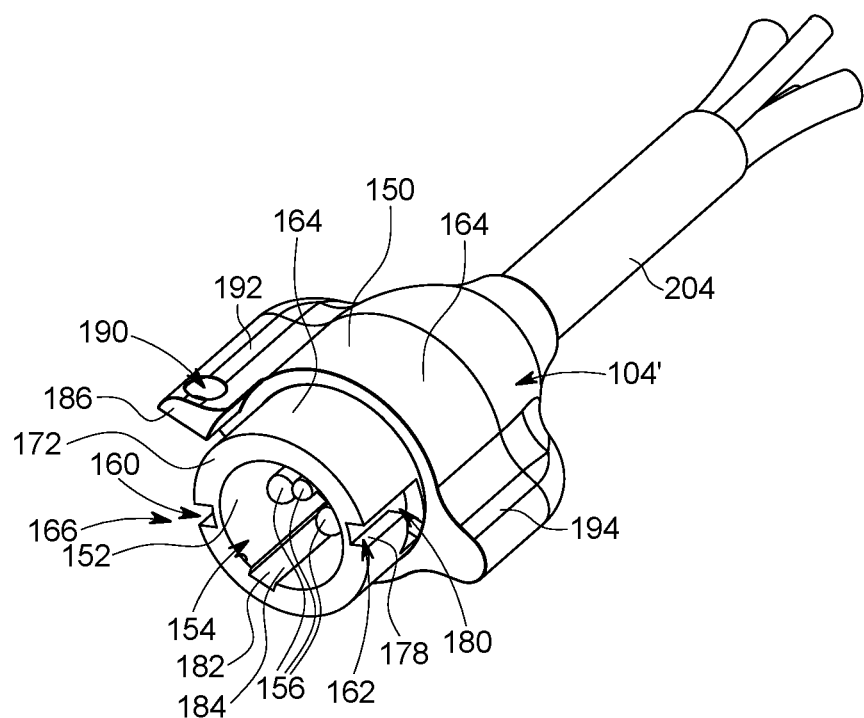
FIG. 6 depicts an enlarged perspective view of the second connector of FIG. 4 according to an embodiment of the disclosure.

Referring to FIGS. 4, 5, and 6, an electrical connector assembly 100' accordingly to an alternative embodiment of the disclosure. The electrical connector assembly 100' includes a first connector 102' and a second connector 104'. The first connector 102' is identical to the first connector 102 of the electrical connector assembly 100', while the second connector 104' is similar to the second connector 104 of the electrical connector assembly 100 except that the housing 202 is omitted from the second connector 104' of the electrical connector assembly 100'. In such a case, the second cable 204 is directly connected to the second connector 104' of the electrical connector assembly 100'. Further, the second connector 104' includes a pair of elongated wings, for example, a third wing 192 and a fourth wing 194 disposed diametrically opposite to the third wing 192, extending outwardly of the socket 150 and extending longitudinally along at least a length of the socket 150. The wings 192, 194 are disposed inwardly at an axial offset from the first longitudinal end 126 of the socket 150. Also, a second lock structure 186 of the second connector 104' extends axially and outwardly from the third wing 192.

Figure 7:
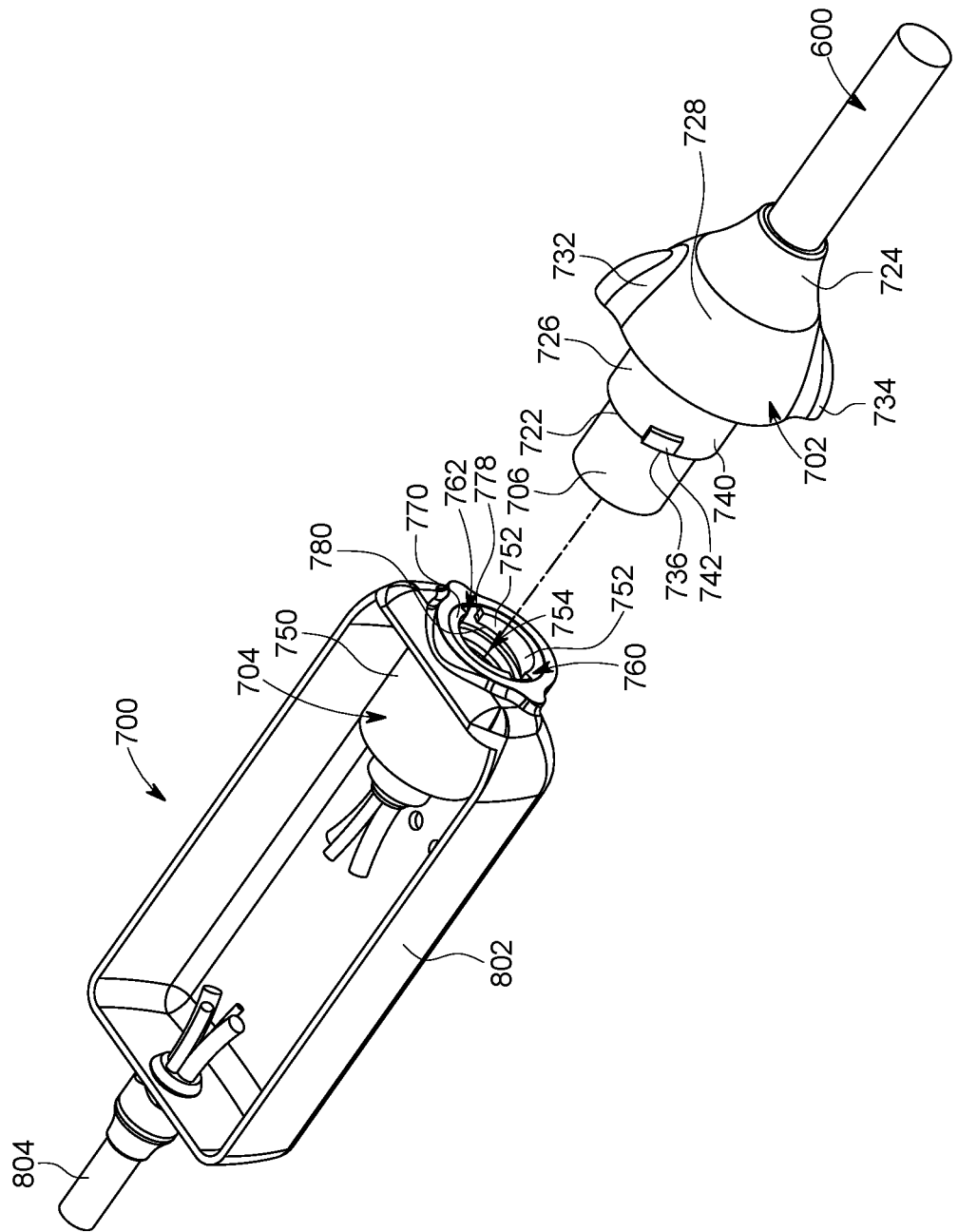
FIG. 7 depicts an electrical connector assembly having a first connector and a second connector, according to an embodiment of the disclosure.
Figure 8:
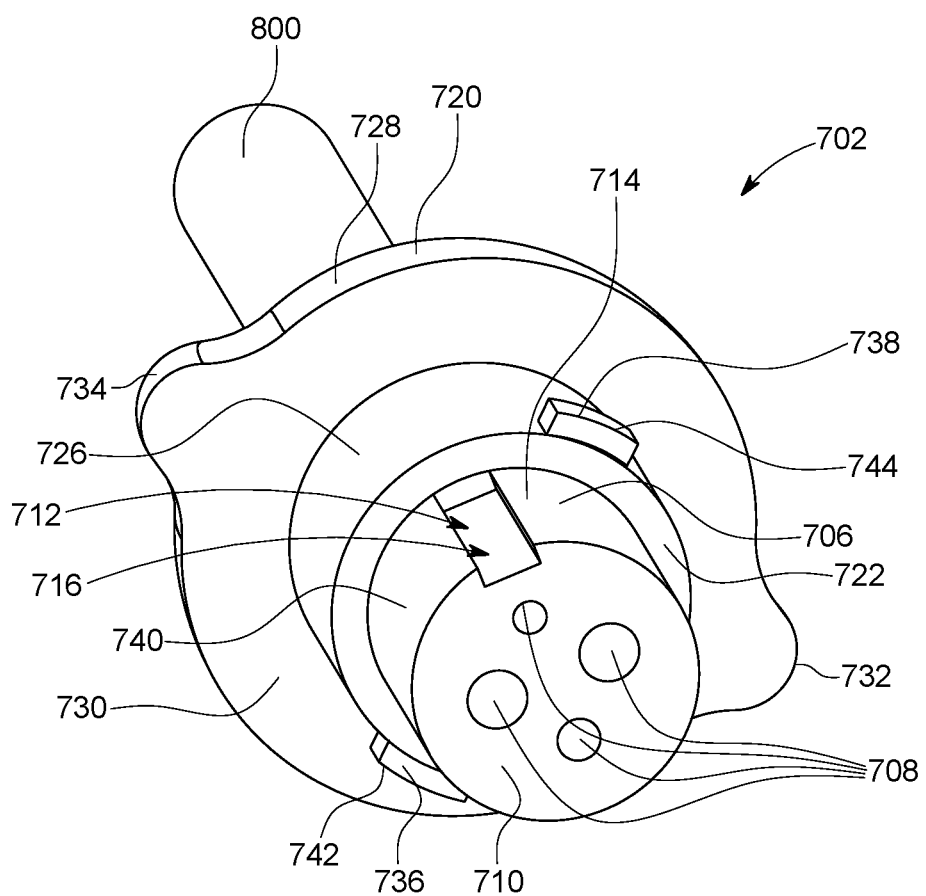
FIG. 8 depicts an enlarged perspective view of the first connector of FIG. 7 according to an embodiment of the disclosure.

Referring to FIG. 7, an electrical connector assembly 700 according to an alternative embodiment is shown. The electrical connector assembly 700 includes a first connector 702 (also referred to as a plug 702) adapted to connect to a first cable 800 and a second connector 704 attached to a housing 802 that in turn is connected to a second cable 804. As shown in FIGS. 7 and 8, the first connector 702 includes a cylindrical body 706 defining a plurality of receptacles 708 extending axially from a first end 710 towards a second end of the cylindrical body 706. Each of the plurality of receptacles 708 defines an access opening at the first end 710 of the cylindrical body 706. In an embodiment, cylindrical body 706 is made of an electrically insulating material, such as, but not limited to, rubber, bakelite, etc. To facilitate an electric connection of the first cable 800 with the second cable 804 through the first connector 702 and the second connector 704, the first connector 702 includes a plurality of conductors (not shown) disposed inside the plurality of receptacles 708. The conductors may be connected to the first cable 800 to enable a flow of electricity from or to the first cable 800.

In an embodiment, the plurality of receptacles 708 may include a first receptacle 708a, a second receptacle 708b, a third receptacle 708c, and a fourth receptacle 708d. In some embodiments, as shown in FIG. 8, the first connector 702 may include a first guide structure 712 extending from the first end 710 towards the second end and arranged at an outer surface 714 of the cylindrical body 706. In an embodiment, the first guide structure 712 may be a groove 716 extending radially inwardly from the outer surface 714 of the cylindrical body 706. The first guide structure 712 facilitates the engagement of the cylindrical body 706, and hence the first connector 702, with the second connector 704 in a correct orientation. Although the groove 716 is contemplated as the first guide structure 712, it may be envisioned that the first guide structure 712 may be a protrusion extending radially outwardly from the outer surface 714 of the cylindrical body 706.

Moreover, the first connector 702 includes a cover 720 arranged surrounding the cylindrical body 706 and adapted to rotate relative to the first cable 800 and the body 706. As shown, the cover 720 includes a first longitudinal end 722, a second longitudinal end 724, a first portion 726, and a second portion 728 extending from the first portion 726 to the second longitudinal end 724. As shown, the first portion 726 extends from the first longitudinal end 722 to the second portion 728 and has a diameter smaller than a diameter of the second portion 728. Accordingly, a step 730 is defined at an interface of the first portion 726 and the second portion 728. Further, as shown in FIGS. 7 and 8, the first longitudinal end 722 is disposed at an offset from the first end 710 of the cylindrical body 706 such that the cylindrical body 706, at least partially, extends outside the cover 720 in an axial direction. In an assembly of the first connector 702 with the second connector 704, the first portion 726 along with the cylindrical body 706 is disposed inside a socket 750, while the second portion 728 is arranged outside the socket 750 and the housing 802 such that the step 730 abuts the housing 802.

Further, the cover 720 includes a pair of elongated wings, for example, a first wing 732 and a second wing 734 disposed diametrically opposite to the first wing 732, directed outwardly and extending longitudinal along a length of the second portion 728 of the cover 720. The wings 732, 734 facilitates a holding of the first connector 702 by an operator and rotation of the cover 720 relative to the cylindrical body 706. Further the cover 720 includes at least engagement structure, for example, a first engagement structure 736 and a second engagement structure 738, disposed along an outer surface 740 of the first portion 726 of the cover 720. The engagement structures 736, 738 are disposed diametrically opposite to each other and are adapted to the couple/engage with the second connector 704 to facilitate a retention and locking of the first connector 702 with the second connector 704. In an embodiment, the engagement structures 736, 738 may be protrusions 742, 744 extending radially outwardly from the outer surface 740 of the first portion 726 and disposed proximate to the first longitudinal end 722.

Figure 9:
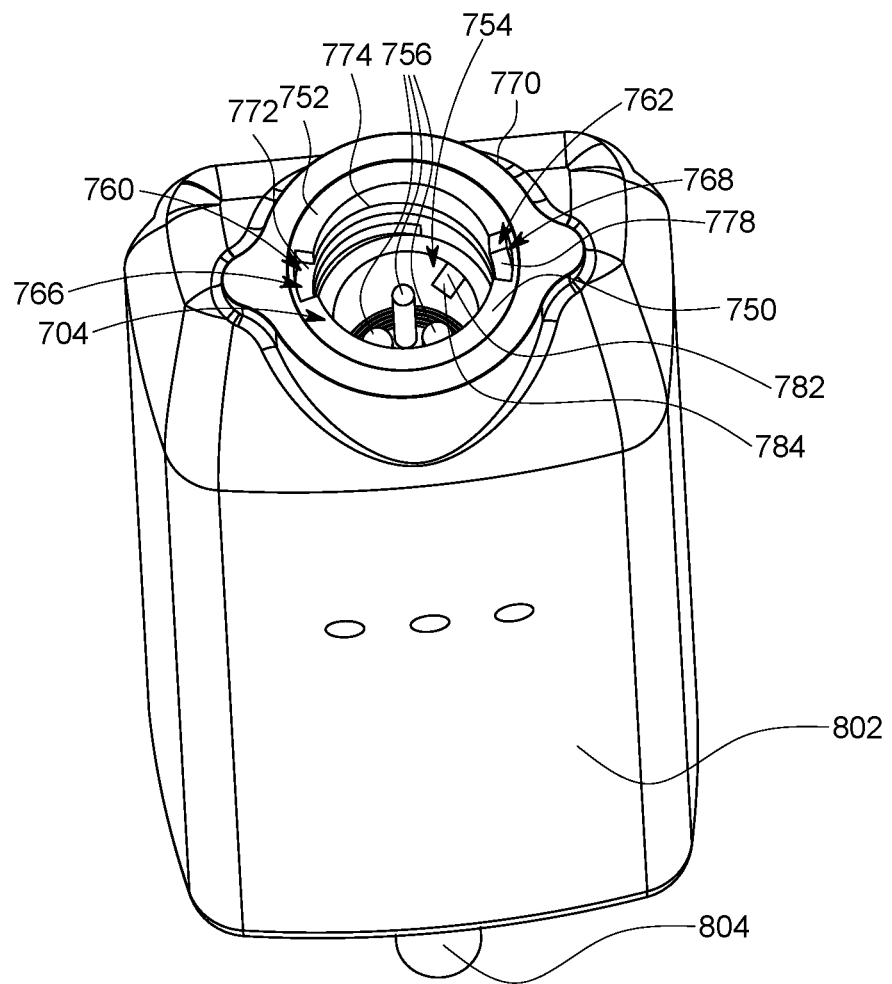
FIG. 9 depicts a side perspective view of the second connector of FIG. 7 according to an embodiment of the disclosure.

Referring back to FIGS. 7, and 9, the second connector 704 is removably coupled to the housing 802 and is arranged, at least partially inside the housing 802. As shown, the second connector 704 includes a socket 750 having an inner surface 752 defining a chamber 754 (also referred to as central cavity 756) and a plurality of pins 756 extending inside the chamber 754. The pins 756 are adapted to extends inside the plurality of receptacles 708 and are electrically connected to the second cable 804. Accordingly, the first connector 702 and the second connector 704 electrically couple the first cable 800 to the second cable 804. Further, in an assembly of the first connector 702 and the second connector 704, the cylindrical body 706 and the first portion 726 are completely arranged/located inside the chamber 154. In an embodiment, a pin 756a has a length and diameter that is relatively large when compared with the remaining pins 756. It may be appreciated, at first, the longest pin 756a is inserted inside the associated receptacle 708. Accordingly, the pins 756 are inserted inside the associated receptacles 708 sequentially. Similarly, during disassembly of the first connector 702 from the second connector 704, the longest pin 756a disengages from the corresponding receptacle 708 after all other pins 756 are removed from the corresponding receptacles 708. In an embodiment, the pin 756a is a ground pin 756a that connects the electrical connector assembly 700 to the ground and provides crucial ground protection to the user. The length of the pin 756a is relatively greater than the remaining pins 756 to ensure that the electrical connector assembly 700 is first connected to the ground before making contact with the power supply mains thereby protecting the user and/or the electrical connector assembly 700. In some embodiments, a signal pin is the shortest pin of the pins such that the signal pin disconnects before the retention structures fully disengage, allowing time for the relays to open and de-energize the output and preventing hot disconnect of the connector.

Further, the second connector 704 includes at least one retention structure, for example, a first retention structure 760 and a second retention structure 762, disposed along the inner surface 752 of the socket 750, and adapted to connect/engage with the engagement structures 736, 738. In an embodiment, the retention structures 760, 762 are helical grooves 766, 768 extending from a first end 770 of the socket 750 and inside the socket 750. As shown in FIG. 7, a first groove 766 of the grooves 766, 768 includes a first straight portion 772 extending axially and inwardly from the first end 770 of the socket 750, and a first curved portion 774 extending from the first straight portion 772 in a helical manner along the inner surface 752. Similarly, a second groove 768 of the grooves 766, 768 includes a second straight portion 778 extending axially and inwardly from the first end 770 of the socket 750, and a second curved portion 780 extending from the second straight portion 778 in a helical manner along the inner surface 752. The straight portions 772, 778 of the grooves 766, 768 facilitate an insertion of the protrusions 742, 744 inside the grooves 766, 768, while the curved portions 774, 780 is adapted to receive the protrusions 742, 744 upon rotation of the cover 720, and facilitate a positive locking of the cover 720 with the socket 750. Further, the curved portions 774, 780 facilitate a linear movement of the cylindrical body 706 and the first portion 726 inside the socket 750 upon the rotation of the cover 720 subsequent to the insertion of the protrusions 742, 744 inside the curved portions 774, 780. In an embodiment, socket 750 may include a second guide structure 782 adapted to engage with the first guide structure 712 to facilitate the insertion of the cylindrical body 706 inside the socket 750 in the correct orientation. In an embodiment, the second guide structure 782 is an elongated protrusion 784 extending in an axial direction. The elongated groove 184 extends radially inwardly from the inner surface 752 of the socket 750.

To facilitate the connection of the first connector 702 with the second connector 704, an operator may push a portion of the cylindrical body 706 inside the chamber. After inserting the cylindrical body 706 inside the socket, the first guide structure 712 is aligned with the second guide structure 782 of the second connector 704 so that the first guide structure 712 engages with the second guide structure 782 and moves along the first guide structure 712 as the cylindrical body 706 is further inserted inside the chamber 154. Further, upon the insertion of the cylindrical body 706 inside the socket 750, the first portion 726 may contact the socket 750. For inserting the first portion 726 inside the socket 750, the protrusions 742, 744 are aligned with the respective straight portions 772, 778 of the grooves 766, 768. For so doing, the operator may rotate the cover 720 relative to the cylindrical body 706 by holding the elongated wings 732, 734. Subsequently, the protrusions 742, 744 move axially inside the corresponding straight portions 772, 778 as the first portion 726 is pushed inside the chamber 754. Thereafter, the user may rotate the cover 720 by holding the elongated wings 732, 734. As the cover 720 is rotated, the protrusions 742, 744 move along the respective curved portions 774, 780 of the grooves 766, 768, causing the cylindrical body 706 along with the first portion 726 to move linearly inside the socket 750. In so doing, the pins 756 are inserted inside the corresponding receptacles 708. The cover is rotated till the step 730 contacts/abuts the housing 802.

Figure 10:
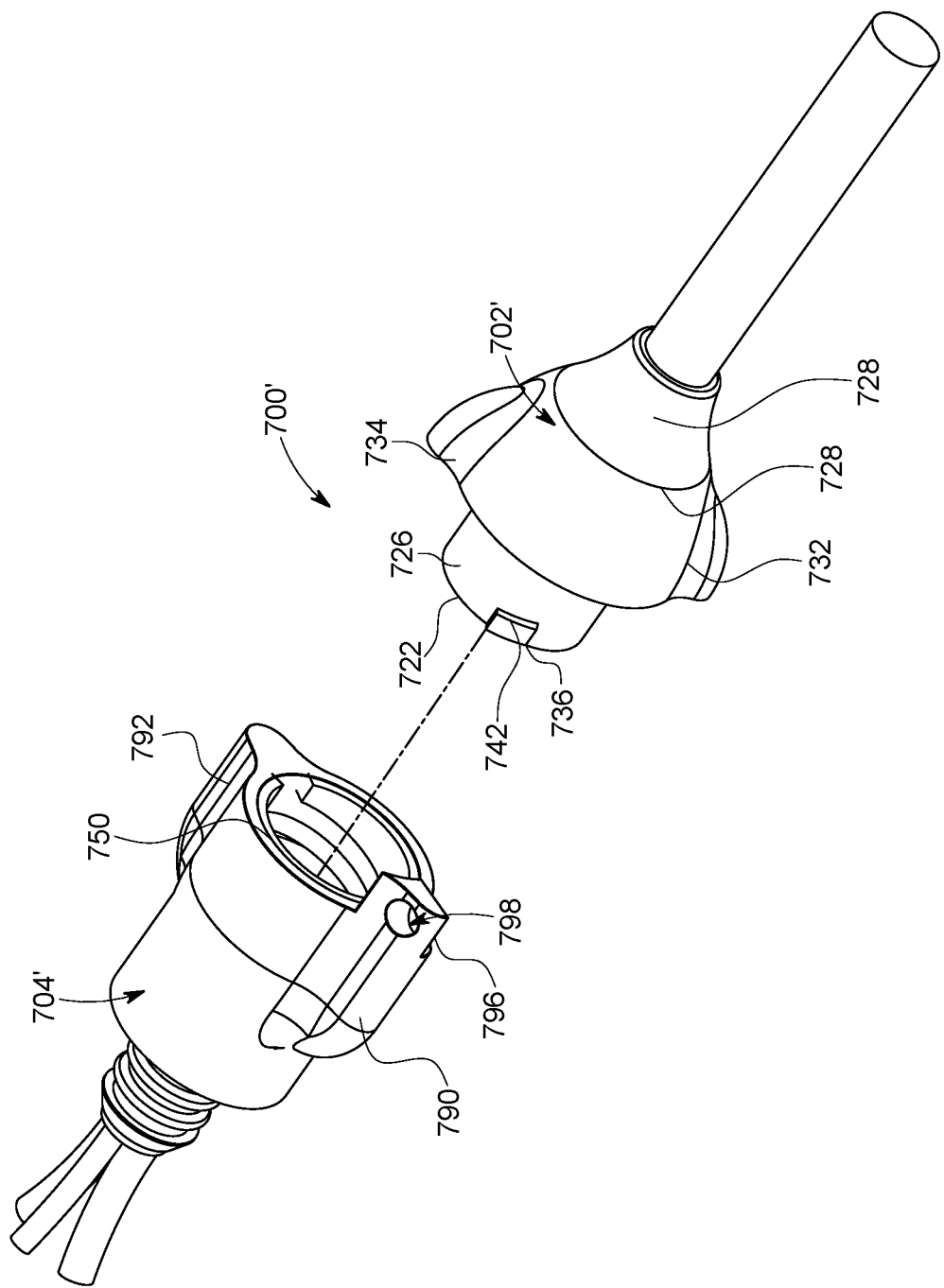
FIG. 10 depicts an electrical connector assembly having a first connector and a second connector, according to an embodiment of the disclosure.
Figure 11:
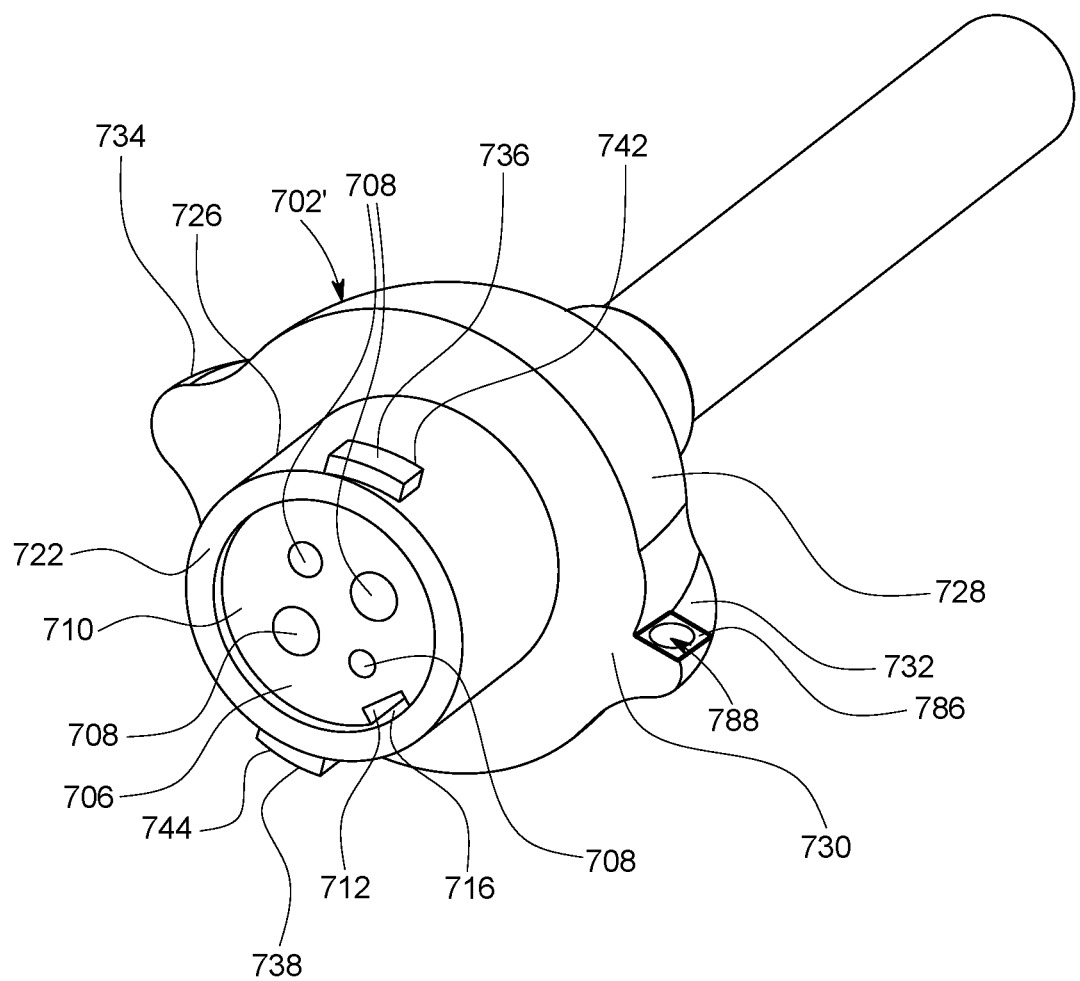
FIG. 11 depicts an enlarged perspective view of the first connector of FIG. 10 according to an embodiment of the disclosure.
Figure 12:
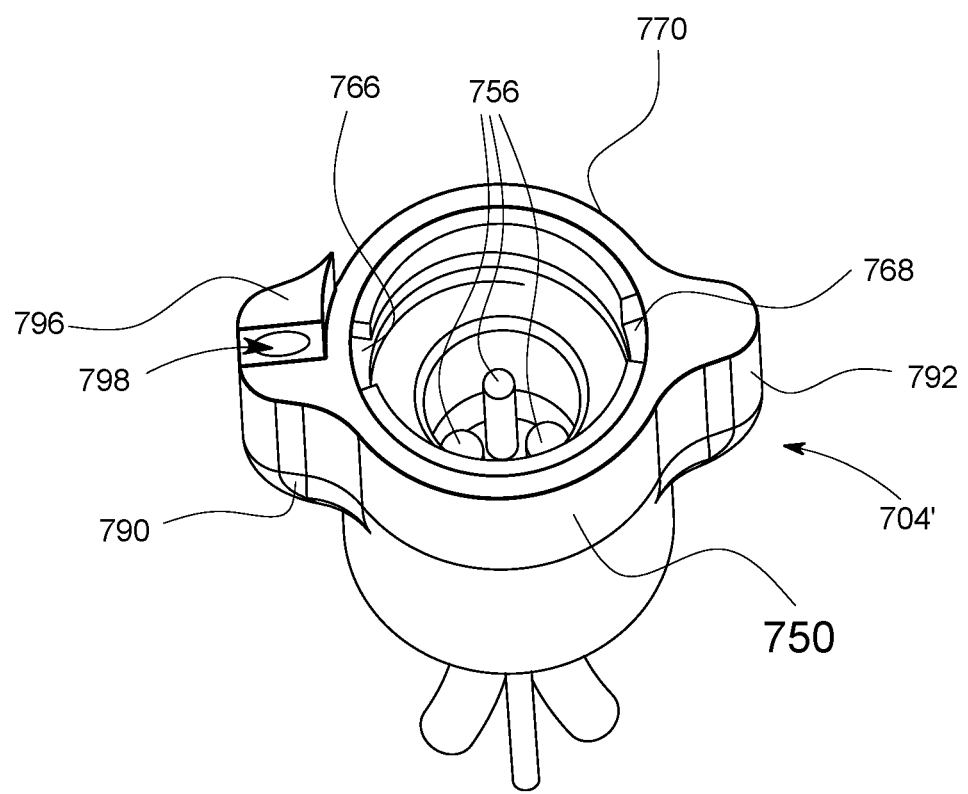
FIG. 12 depicts a side perspective view of the second connector of FIG. 10 according to an embodiment of the disclosure.

Referring to FIGS. 10, 11, and 12, an electrical connector assembly 700' accordingly to an alternative embodiment of the disclosure. The electrical connector assembly 700' includes a first connector 702' and a second connector 704'. The first connector 702' is similar to the first connector 702 of the electrical connector assembly 700' except that a cylindrical body 706 of the first connector 702' is disposed inside a first portion 726 of a cover 720 of the first connector 702'. Further, the first connector 702' includes a first lock structure 786 extending axially from a first wing 732 of the cover 720 from a second portion 728 of the cover 720 towards a first longitudinal end 722 of the cover 720. Also, the first lock structure 786 is adapted to engage with the second connector 704' and defines a first padlock hole 788 extending through an entire thickness of the first lock structure 786. The first padlock hole 788 facilitates a locking of the first connector 702' with the second connector 704' and includes an axis that is substantially perpendicular to a longitudinal axis of the cylindrical body 706.

Moreover, the second connector 704' of the electrical connector assembly 700' is similar to the second connector 704 of the electrical connector assembly 700 except that the housing 802 is omitted from the electrical connector assembly 700'. In such a case, the second cable 804 is directly connected to the second connector 704' of the electrical connector assembly 700'. Further, the second connector 704' includes a pair of elongated wings, for example, a third wing 790 and a fourth wing 792 disposed diametrically opposite to the third wing 790, extending radially outwardly of a socket 750 of the second connector 704'. Further, the elongated wings 790, 792 extend longitudinally along at least a length of the socket 750, and are adapted to abut the wings 732, 734 of the first connector 702'. Also, the second connector 704' includes a second lock structure 796 extending axially from the third wing 790 and outwardly of a first end 770 of the socket 750. Also, the second lock structure 796 is adapted to engage with the first lock structure 786 and defines a second padlock hole 798 extending through an entire thickness of the second lock structure 796. The first padlock hole 798 facilitates a locking of the first connector 702' with the second connector 704' and includes an axis that is substantially perpendicular to a longitudinal axis of the socket 750.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. An electrical connector assembly comprising:
   a socket defining a central cavity and having a plurality of pins arranged inside the central cavity; and
   a plug comprising:
   a body adapted to extend, at least partially, inside the central cavity and defining a plurality of receptacles to receive the plurality of pins; and
   a cover arranged to surround the body and adapted to engage with the socket, the cover comprising a pair of elongated wings arranged diametrically opposite to each other and directed outwardly and extending along a longitudinal portion of the cover;
   wherein the cover includes at least one engagement structure and the socket includes at least one retention structure adapted to engage with the at least one engagement structure to retain and lock the plug with the socket;
   wherein the at least one retention structure comprises at least one of: a groove and a protrusion adapted to be arranged inside the groove; and
   wherein the cover is arranged circularly around the body defining a gap therebetween, wherein the protrusion extends radially inwardly inside the gap from the cover, and the groove is defined along an outer surface of the socket.

2. An electrical connector assembly comprising:
   a socket defining a central cavity and having a plurality of pins arranged inside the central cavity; and
   a plug comprising:
   a body adapted to extend, at least partially, inside the central cavity and defining a plurality of receptacles to receive the plurality of pins; and
   a cover arranged to surround the body and adapted to engage with the socket, the cover comprising a pair of elongated wings arranged diametrically opposite to each other and directed outwardly and extending along a longitudinal portion of the cover;
   wherein the cover includes at least one engagement structure and the socket includes at least one retention structure adapted to engage with the at least one engagement structure to retain and lock the plug with the socket;
   wherein the at least one retention structure comprises at least one of: a groove and a protrusion adapted to be arranged inside the groove; and
   wherein the protrusion extends radially outwardly from the cover, and the groove is defined by an inner surface of the socket.

3. The electrical connector assembly of claim 2, wherein the cover includes a first portion adapted to be inserted inside the socket and a second portion extending rearwardly from the first portion, wherein the pair of elongated wings extends outwardly of the second portion and the at least one retention structure extends radially outwardly of the first portion.

4. An electrical connector assembly comprising:
   a socket defining a central cavity and having a plurality of pins arranged inside the central cavity; and
   a plug comprising:
   a body adapted to extend, at least partially, inside the central cavity and defining a plurality of receptacles to receive the plurality of pins; and
   a cover arranged to surround the body and adapted to engage with the socket, the cover comprising a pair of elongated wings arranged diametrically opposite to each other and directed outwardly and extending along a longitudinal portion of the cover;
   wherein the cover includes at least one engagement structure and the socket includes at least one retention structure adapted to engage with the at least one engagement structure to retain and lock the plug with the socket;
   wherein the at least one retention structure comprises at least one of: a groove and a protrusion adapted to be arranged inside the groove; and
   wherein the groove includes:
   a straight portion extending axially from an end of the socket to facilitate an insertion of the protrusion inside the groove, and
   a curved portion extending circularly from the first portion and arranged along at least a portion of a circumference of the socket, wherein the protrusion is positioned inside the curved portion to lock the plug with the socket.

5. The electrical connector assembly of claim 4, wherein the curved portion is a helical groove extending along an inner surface of the socket.

6. The electrical connector assembly of claim 1, wherein the plug includes a first guide structure extending axially along an outer surface of the body, and the socket includes a second guide structure extending axially along an inner surface of the socket and adapted to engage with the first guide structure to facilitate the engagement of the plug with the socket in a correct orientation.

7. The electrical connector assembly of claim 1 further including a housing to house a plurality of electrical circuits, wherein the socket is removably engaged with the housing and is at least partially disposed inside the housing.

8. The electrical connector assembly of claim 1, wherein the plug includes a first lock structure extending axially from one of the pair of elongated wings, and the socket includes a second lock structure adapted to engage with the first lock structure to facilitate a locking of the plug with the socket.

* * * * *